US011423334B2

United States Patent
Venkateswaran et al.

(10) Patent No.: US 11,423,334 B2
(45) Date of Patent: Aug. 23, 2022

(54) SEMANTIC CONSISTENCY OF EXPLANATIONS IN EXPLAINABLE ARTIFICIAL INTELLIGENCE APPLICATIONS

(71) Applicant: KYNDRYL, INC., New York, NY (US)

(72) Inventors: Sreekrishnan Venkateswaran, Bangalore (IN); Debasisha Padhi, Bangalore (IN); Shubhi Asthana, Santa Clara, CA (US); Anuradha Bhamidipaty, Yorktown Heights, NY (US); Ashish Kundu, Elmsford, NY (US)

(73) Assignee: KYNDRYL, INC., New York, NY (US)

( * ) Notice: Subject to any disclaimer, the term of this patent is extended or adjusted under 35 U.S.C. 154(b) by 351 days.

(21) Appl. No.: 16/870,202

(22) Filed: May 8, 2020

(65) Prior Publication Data

US 2021/0350275 A1    Nov. 11, 2021

(51) Int. Cl.
*G06N 20/00* (2019.01)
*G06F 17/16* (2006.01)
(Continued)

(52) U.S. Cl.
CPC ............. *G06N 20/00* (2019.01); *G06F 17/16* (2013.01); *G06F 40/30* (2020.01); *G06N 3/08* (2013.01)

(58) Field of Classification Search
CPC .......... G06N 20/00; G06N 3/08; G06F 17/16; G06F 40/30
See application file for complete search history.

(56) References Cited

U.S. PATENT DOCUMENTS

2019/0197357 A1   6/2019   Anderson
2019/0205732 A1   7/2019   George
(Continued)

OTHER PUBLICATIONS

Mell, Peter et al.; "The NIST Definition of Cloud Computing;" National Institute of Standards and Technology; Special Publication 800-145; Sep. 2011; 7 pages.
(Continued)

*Primary Examiner* — Michelle M Koeth
*Assistant Examiner* — Darioush Agahi
(74) *Attorney, Agent, or Firm* — Zilka-Kotab, P.C.

(57) ABSTRACT

An explainable artificially intelligent (XAI) application contains an ordered sequence of artificially intelligent software modules. When an input dataset is submitted to the application, each module generates an output dataset and an explanation that represents, as a set of Boolean expressions, reasoning by which each output element was chosen. If any pair of explanations are determined to be semantically inconsistent, and if this determination is confirmed by further determining that an apparent inconsistency was not a correct response to an unexpected characteristic of the input dataset, nonzero inconsistency scores are assigned to inconsistent elements of the pair of explanations. If the application's overall inconsistency score exceeds a threshold value, the system forwards information about the explanation, the offending modules, and the input dataset to a downstream machine-learning component that uses this information to train the application to better respond to future input that shares certain characteristics with the current input.

20 Claims, 5 Drawing Sheets

(51) Int. Cl.
*G06F 40/30* (2020.01)
*G06N 3/08* (2006.01)

(56) References Cited

U.S. PATENT DOCUMENTS

2021/0334693 A1* 10/2021 Bavly ................... G06N 5/04
2022/0172146 A1*  6/2022 Zillner .................. G06N 3/08

OTHER PUBLICATIONS

Chen, Runjin et al.; Explaining Neural Networks Semantically and Quantitatively; 2091 IEEE/CVF International Conference on Computer Vision; Oct. 27-Nov. 2, 2019; 10 pages.
Dhurandhar, Amit et al.; Explanations based on the Missing: Towards Contrastive Explanations with Pertinent Negatives; arXiv: 1802.07623v2; Oct. 29, 2018; 22 pages.
Ribeiro, Marco Tulio et al.; "Why Should I Trust You?" Explaining the Predictions of Any Classifier; arXiv: 1602.04938v3; Aug. 9, 2016; 10 pages.
Silva, Vivian S. et al.; On the Semantic Interpretability of Artificial Intelligence Models; arXiv:1907.04105v1;https://arxiv.org/pdf/1907.04105.pdf; Jul. 9, 2019; 17 pages.

* cited by examiner

SEMANTIC CONSISTENCY OF EXPLANATIONS IN EXPLAINABLE ARTIFICIAL INTELLIGENCE APPLICATIONS

BACKGROUND

The present invention relates in general to Explainable Artificial Intelligence ("explainable AI" or "XAI") technology and in particular to resolving semantic inconsistencies among explanations generated by XAI systems.

Explainable AI refers to applications of artificial intelligence technology (AI), such as certain expert systems, that explain the results they produce in a form that can be understood by humans. XAI augments conventional "black box" AI and machine-learning methodologies in which even a designer of an artificially intelligent application cannot determine why the application arrived at a particular decision.

SUMMARY

Embodiments of the present invention comprise systems, methods, and computer program products for an improved explainable artificially intelligent (XAI) application. The application contains an ordered sequence of artificially intelligent software modules. When an input dataset is submitted to the application, each module generates an output dataset and explanations that represent, as a set of Boolean expressions, reasoning by which each element of the output dataset was chosen by the corresponding module. Each module's output is a set of elements generated as a function of the input dataset and of output generated by the module, if any, that is immediately preceding in the sequence. If any pair of explanations are confirmed to be semantically inconsistent, nonzero inconsistency scores are assigned to the inconsistent elements of the explanations. Corresponding elements of a pair of explanations are deemed to be inconsistent if the Boolean expressions embodied by the explanations evaluate to FALSE conditions or if the explanations' corresponding modules produced disjoint outputs in response to the particular contents of the input dataset. The system confirms whether explanations found to be semantically inconsistent by this method are in fact inconsistent or merely appear to be anomalous because the input dataset contained an unexpected characteristic. If the overall confirmed inconsistency score of the entire application exceeds a threshold value, a downstream machine-learning component uses the inconsistency information to train the application to better respond to future input datasets that share certain characteristics with the current input dataset. In some embodiments, a human developer or computerized design application would also attempt to determine whether the semantic inconsistencies occurred as a function of a correctable design error in the application.

DETAILED DESCRIPTION

Explainable Artificial Intelligence (XAI) refers to applications of artificial intelligence technology (AI) that explain how they arrived at a particular decision. The format of these explanations is implementation-dependent, including combinations of natural-language text, numeric codes, Boolean expressions, or other mechanisms for communicating the reasons why an XAI application made a certain decision or produced certain output. XAI technology may be incorporated into many types of AI applications, such as expert systems and other types of self-learning XAI augments "black box" AI and machine-learning technologies in which even an application's designer cannot be sure why the application arrived at a particular decision. An explainable AI application can enumerate inferences upon which such decisions are based, informing users, designers, administrators, or downstream systems how, when, and how well a particular AI model works. This information can be used to decide whether an application requires further training or whether it would be practical to migrate a particular AI application, such as a trained deep-learning neural network, to a different field.

When an XAI application comprises an ensemble of serially connected models, explanations produced by each model are most useful if they are formally and logically consistent. This can be especially challenging when models migrated from different applications produce discrepancies or when different designers have modeled the same application differently, or for a different purpose. In such cases, the explanations or output produced by these models may not be consistent.

For example, a multi-lingual AI-based conversational system may seem to produce different results when certain types of otherwise-identical input datasets are entered in different languages. Similarly, certain inputs may cause a fraud-detection system to reach conclusions that, when considered within the context of national averages, appears to be statistical outliers. In such cases, if explanations produced by different modules of a known XAI system are semantically inconsistent, those explanations must be considered unreliable.

Even an application that is presumed to have been adequately trained may suffer from subtle, infrequent inferential errors and inconsistencies that were not detected during the application's machine-learning sessions or other known training and verification mechanisms. XAI systems are especially vulnerable to these types of problems when semantic inconsistencies between two models' explanations make it hard to know when or why the models' artificially intelligent inferences have produced contradictory or irrelevant results.

When this happens, a system that is known to have been producing good results may unexpectedly generate unexpected outcome when fed a particular input dataset. Known explainability functions may in such cases produce contradictory or inconsistent explanations, making it difficult to tell whether the unexpected outcome is erroneous or is explainable as an unusual, but correct, result. This problem is especially troublesome if there is a possibility that an offending dataset was generated by a hostile party in order to defraud or otherwise deceive the XAI system.

Embodiments of the present invention improve known XAI technology by providing a mechanism for quantifying semantic consistency among explanations produced by modules of an XAI-based application when processing certain inputs, and using the resulting analysis to pinpoint those modules responsible for the inconsistency. This allows developers, automated application-management tools, or downstream systems to better determine whether the seemingly anomalous results should be trusted and, if necessary, to then take remedial action, such as further training or redesigning some or all of the XAI modules.

These improvements to known XAI technology improve XAI applications and systems by providing more robust operation, the ability to handle a broader range of input, and greater overall reliability. These improvements also make XAI-based ensembles easier to maintain and debug because they provide useful debugging information without requiring, as do known implementations, analysis of each individual module in order to identify the source of a possible error.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
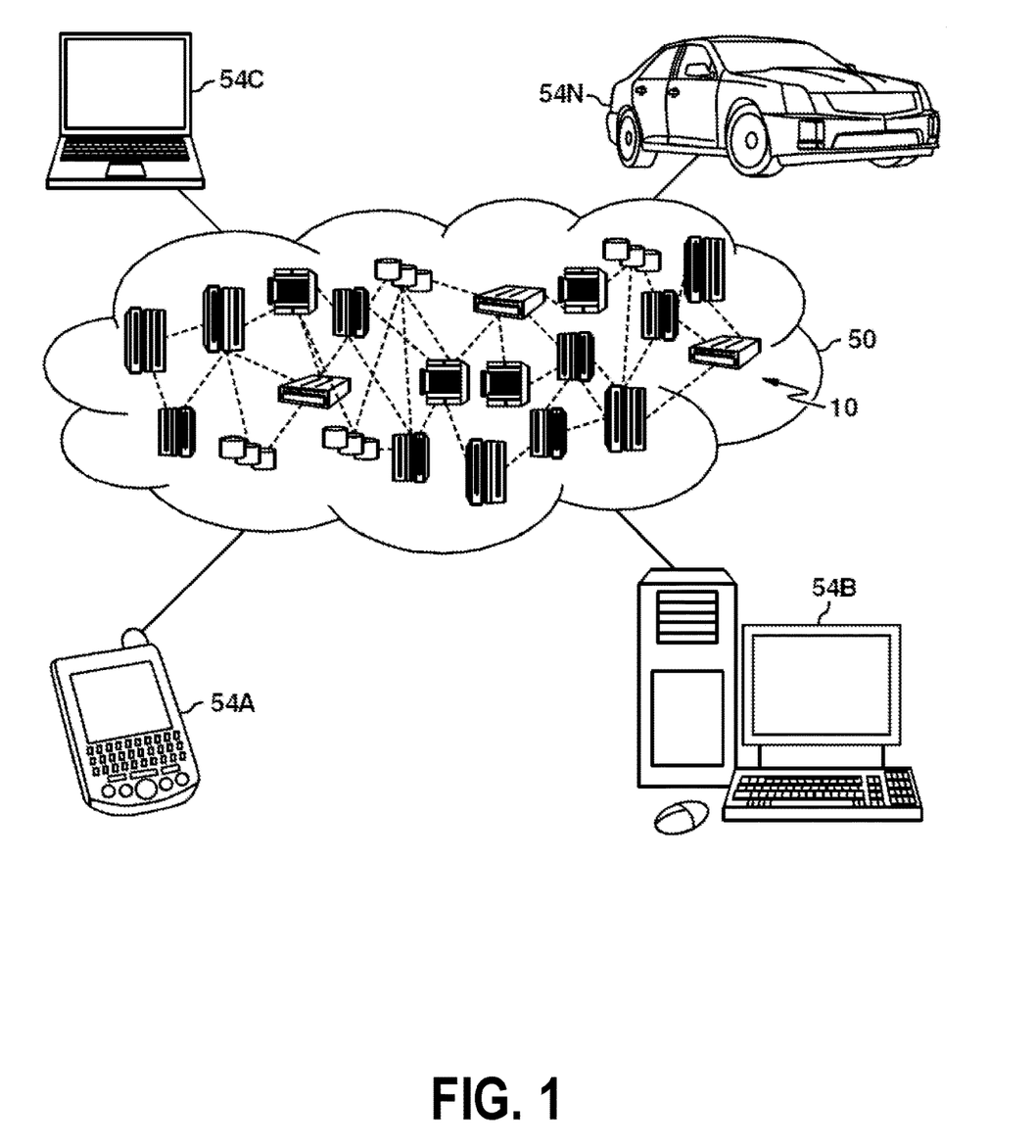
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
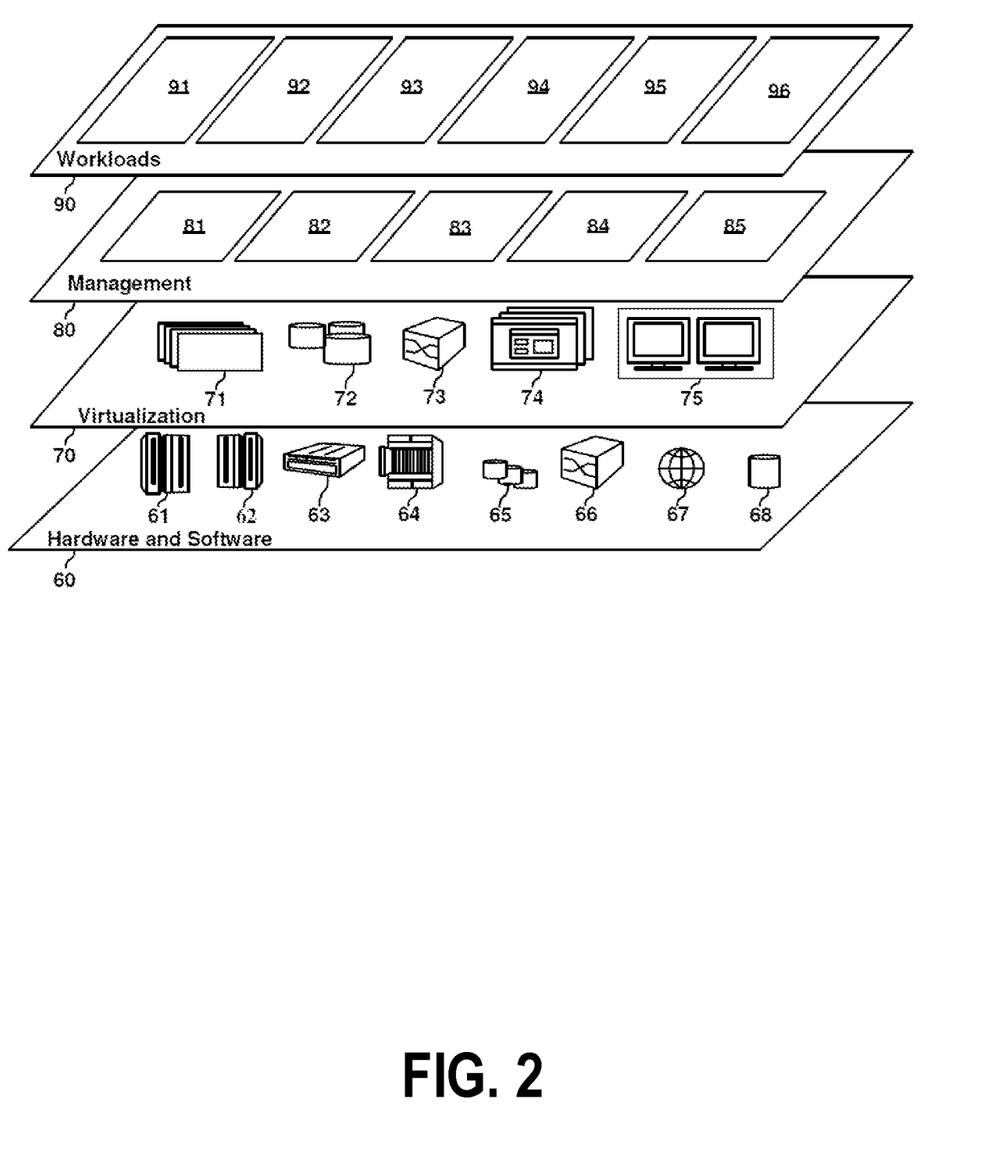
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and orchestration of complex methods, systems, and computer program products for improved semantic consistency of machine-learning explanations 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
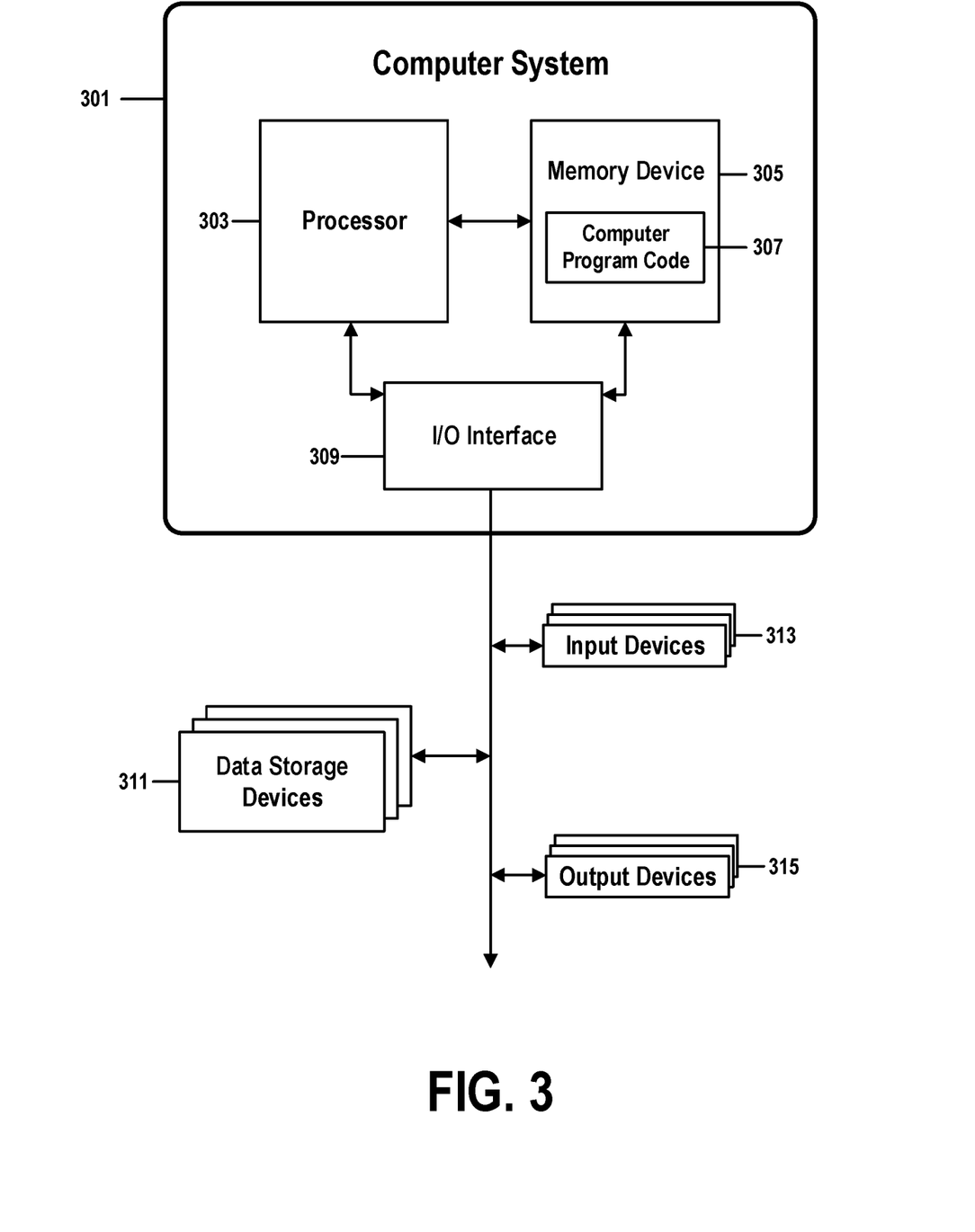
FIG. 3 shows the structure of a computer system and computer program code that may be used to implement a method for improved semantic consistency of explanations in explainable artificial intelligence applications in accordance with embodiments of the present invention.

FIG. 3 shows a structure of a computer system and computer program code that may be used to implement a method for improved semantic consistency of explanations in explainable artificial intelligence applications in accordance with embodiments of the present invention. FIG. 3 refers to objects 301-315.

In FIG. 3, computer system 301 comprises a processor 303 coupled through one or more I/O Interfaces 309 to one or more hardware data storage devices 311 and one or more I/O devices 313 and 315.

Hardware data storage devices 311 may include, but are not limited to, magnetic tape drives, fixed or removable hard disks, optical discs, storage-equipped mobile devices, and solid-state random-access or read-only storage devices. I/O devices may comprise, but are not limited to: input devices 313, such as keyboards, scanners, handheld telecommunications devices, touch-sensitive displays, tablets, biometric readers, joysticks, trackballs, or computer mice; and output devices 315, which may comprise, but are not limited to printers, plotters, tablets, mobile telephones, displays, or sound-producing devices. Data storage devices 311, input devices 313, and output devices 315 may be located either locally or at remote sites from which they are connected to I/O Interface 309 through a network interface.

Processor 303 may also be connected to one or more memory devices 305, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 305 contains stored computer program code 307, which is a computer program that comprises computer-executable instructions. The stored computer program code includes a program that implements a method for improved semantic consistency of explanations in explainable artificial intelligence applications in accordance with embodiments of the present invention, and may implement other embodiments described in this specification, including the methods illustrated in FIGS. 1-5. The data storage devices 311 may store the computer program code 307. Computer program code 307 stored in the storage devices 311 is configured to be executed by processor 303 via the memory devices 305. Processor 303 executes the stored computer program code 307.

In some embodiments, rather than being stored and accessed from a hard drive, optical disc or other writeable, rewriteable, or removable hardware data-storage device 311, stored computer program code 307 may be stored on a static, nonremovable, read-only storage medium such as a Read-Only Memory (ROM) device 305, or may be accessed by processor 303 directly from such a static, nonremovable, read-only medium 305. Similarly, in some embodiments, stored computer program code 307 may be stored as computer-readable firmware, or may be accessed by processor 303 directly from such firmware, rather than from a more dynamic or removable hardware data-storage device 311, such as a hard drive or optical disc.

Thus the present invention discloses a process for supporting computer infrastructure, integrating, hosting, maintaining, and deploying computer-readable code into the computer system 301, wherein the code in combination with the computer system 301 is capable of performing a method for improved semantic consistency of explanations in explainable artificial intelligence applications.

Any of the components of the present invention could be created, integrated, hosted, maintained, deployed, managed, serviced, supported, etc. by a service provider who offers to facilitate a method for improved semantic consistency of explanations in explainable artificial intelligence applications. Thus the present invention discloses a process for deploying or integrating computing infrastructure, comprising integrating computer-readable code into the computer system 301, wherein the code in combination with the computer system 301 is capable of performing a method for improved semantic consistency of explanations in explainable artificial intelligence applications.

One or more data storage devices 311 (or one or more additional memory devices not shown in FIG. 3) may be used as a computer-readable hardware storage device having a computer-readable program embodied therein and/or having other data stored therein, wherein the computer-readable program comprises stored computer program code 307. Generally, a computer program product (or, alternatively, an article of manufacture) of computer system 301 may comprise the computer-readable hardware storage device.

In embodiments that comprise components of a networked computing infrastructure, a cloud-computing environment, a client-server architecture, or other types of distributed platforms, functionality of the present invention may be implemented solely on a client or user device, may be implemented solely on a remote server or as a service of a cloud-computing platform, or may be split between local and remote components.

While it is understood that program code 307 for a method for improved semantic consistency of explanations in explainable artificial intelligence applications may be deployed by manually loading the program code 307 directly into client, server, and proxy computers (not shown) by loading the program code 307 into a computer-readable storage medium (e.g., computer data storage device 311), program code 307 may also be automatically or semi-automatically deployed into computer system 301 by sending program code 307 to a central server (e.g., computer system 301) or to a group of central servers. Program code 307 may then be downloaded into client computers (not shown) that will execute program code 307.

Alternatively, program code 307 may be sent directly to the client computer via e-mail. Program code 307 may then either be detached to a directory on the client computer or loaded into a directory on the client computer by an e-mail option that selects a program that detaches program code 307 into the directory.

Another alternative is to send program code 307 directly to a directory on the client computer hard drive. If proxy servers are configured, the process selects the proxy server code, determines on which computers to place the proxy servers' code, transmits the proxy server code, and then installs the proxy server code on the proxy computer. Program code 307 is then transmitted to the proxy server and stored on the proxy server.

In one embodiment, program code 307 for a method for improved semantic consistency of explanations in explainable artificial intelligence applications is integrated into a client, server and network environment by providing for program code 307 to coexist with software applications (not shown), operating systems (not shown) and network operating systems software (not shown) and then installing program code 307 on the clients and servers in the environment where program code 307 will function.

The first step of the aforementioned integration of code included in program code 307 is to identify any software on the clients and servers, including the network operating system (not shown), where program code 307 will be deployed that are required by program code 307 or that work in conjunction with program code 307. This identified software includes the network operating system, where the network operating system comprises software that enhances a basic operating system by adding networking features. Next, the software applications and version numbers are identified and compared to a list of software applications and correct version numbers that have been tested to work with program code 307. A software application that is missing or that does not match a correct version number is upgraded to the correct version.

A program instruction that passes parameters from program code 307 to a software application is checked to ensure that the instruction's parameter list matches a parameter list required by the program code 307. Conversely, a parameter passed by the software application to program code 307 is checked to ensure that the parameter matches a parameter required by program code 307. The client and server operating systems, including the network operating systems, are identified and compared to a list of operating systems, version numbers, and network software programs that have been tested to work with program code 307. An operating system, version number, or network software program that does not match an entry of the list of tested operating systems and version numbers is upgraded to the listed level on the client computers and upgraded to the listed level on the server computers.

After ensuring that the software, where program code 307 is to be deployed, is at a correct version level that has been tested to work with program code 307, the integration is completed by installing program code 307 on the clients and servers.

Embodiments of the present invention may be implemented as a method performed by a processor of a computer system, as a computer program product, as a computer system, or as a processor-performed process or service for supporting computer infrastructure.

Figure 4:
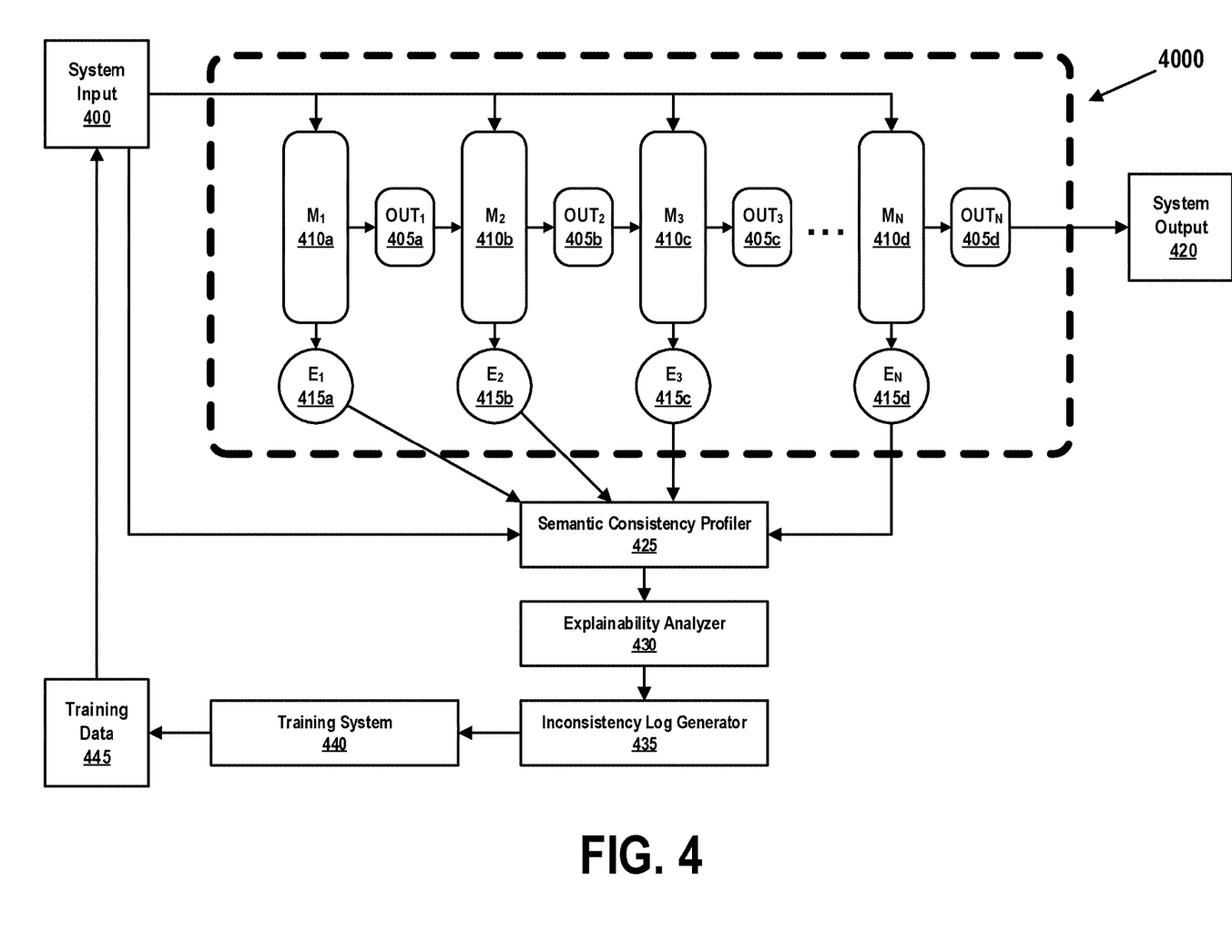
FIG. 4 shows a high-level architecture of an XAI-based artificially intelligent software application with enhancements for providing improved semantic consistency of explanations, in accordance with embodiments of the present invention.

FIG. 4 shows a high-level architecture of an XAI-based artificially intelligent software application 4000 and enhancements 425-435 for providing improved semantic consistency of explanations, in accordance with embodiments of the present invention. FIG. 4 shows items 4000 and 400-455. Items that have subscripted labels in FIG. 4 are equivalent in form and function to items labeled in the below text with parenthetical labels. For example, label M(N) in the text below identifies the graphical object labeled MN in the FIG. 4.

XAI-compliant application 4000 is comprised of N artificially intelligent modules M(1)-M(N) 410a-410d, each of which produces a corresponding output OUT(1)-OUT(N) 410a-410d and an explanation E(1)-E(N) 415a-415d of each corresponding output. Modules M(1)-M(N) 410a-410d could, for example, be sequentially linked expert systems or could each be layers of a single deep-learning AI application, a convolutional neural network (CNN), or a long-term recurrent convolution network (LTRC) 4000, where each module implements a cognitive model that generates output forwarded as input to the next module/model in the application 4000. For example, module M(2) 410b generates output OUT(2) 405b, which becomes input for the next module M(3) 410c, and generates an explanation E(2) 415b, which provides an explanation of output OUT(2) 405b, such as a Boolean expression, data structure, or text that identifies context, logic, or conditions from which decisions underlying output OUT(2) 405b were inferred.

In the embodiment of FIG. 4, Application 4000 receives an input dataset 400, which is forwarded as input to the first XAI-based module M(1) 410a. The artificially intelligent model embodied by module M(1) 410a, based on receiving input 400, forwards output OUT(1) 405a to the next module in application 4000, module M(2) 410b. Module M(2) 410b then generates output OUT(2) 405b, which is forwarded to the next module M(3) 410c, and so forth. This sequential process ends when the final module of application 4000, module M(N) 405*d*, generates output OUT(N) 405*d*, which becomes the overall output 420 of the entire application 4000.

In certain implementations, the elements of input data set 400 are propagated as input to all modules M(1)-M(N) 410*a*-410*d*. In such cases each module 410*b*-410*d* generates output as a function of both the output of an immediately preceding module and of the original values of elements of input dataset 400.

Each module M(1)-M(N) 410*a*-410*d* generates an explanation E(1)-E(N) 415*a*-415*d* that is forwarded to a semantic-consistency profiler module 425 (or profiler 425). Profiler 425 determines, by means of known methods of artificial intelligence, whether any inconsistencies between pairs of explanations E(1)-E(N) 415*a*-415*d* should be ignored in light of known attributes of system input 400 and boundary conditions or other constraints of the modules that generate the pair of seemingly inconsistent explanations. If so, those explanations are eliminated from further processing by Explainability Analyzer 430.

The remaining explanations of explanations E(1)-E(N) 415*a*-415*d* are forwarded to explainability analyzer 430, which generates an "Inconsistency Vector" that quantifies the degree of inconsistency between each pair of the remaining explanations.

Inconsistency log generator (435 (or log generator 435) creates an inconsistency log of the semantic inconsistencies identified by explainability analyzer 430. The log comprises a record of each inconsistency, identifying the pair of modules and the input dataset 400 that generated the inconsistent explanations. In certain embodiments, the log also identifies the output of each module that generated an inconsistent explanation.

The log is fed to the training system 440 that trains XAI application 4000. Training system 440 may implement any mechanism known for training an artificially intelligent application, such as the training components of a machine-learning application. Training system 440, using AI training methods known in the art, incorporates the log information into a machine-learning training corpus or other type of formalized training data 445. This training data 445 is used to further train application 4000 to recognize, report, or take action to mitigate inconsistencies similar to those identified by the inconsistency log. In some embodiments, the updated corpus may be resubmitted to application 4000 as a new input dataset 400, possibly after application 4000 has learned how to properly respond to the new input dataset 400 or has been deliberately redesigned to know better how to respond to the new input dataset 400.

Figure 5:
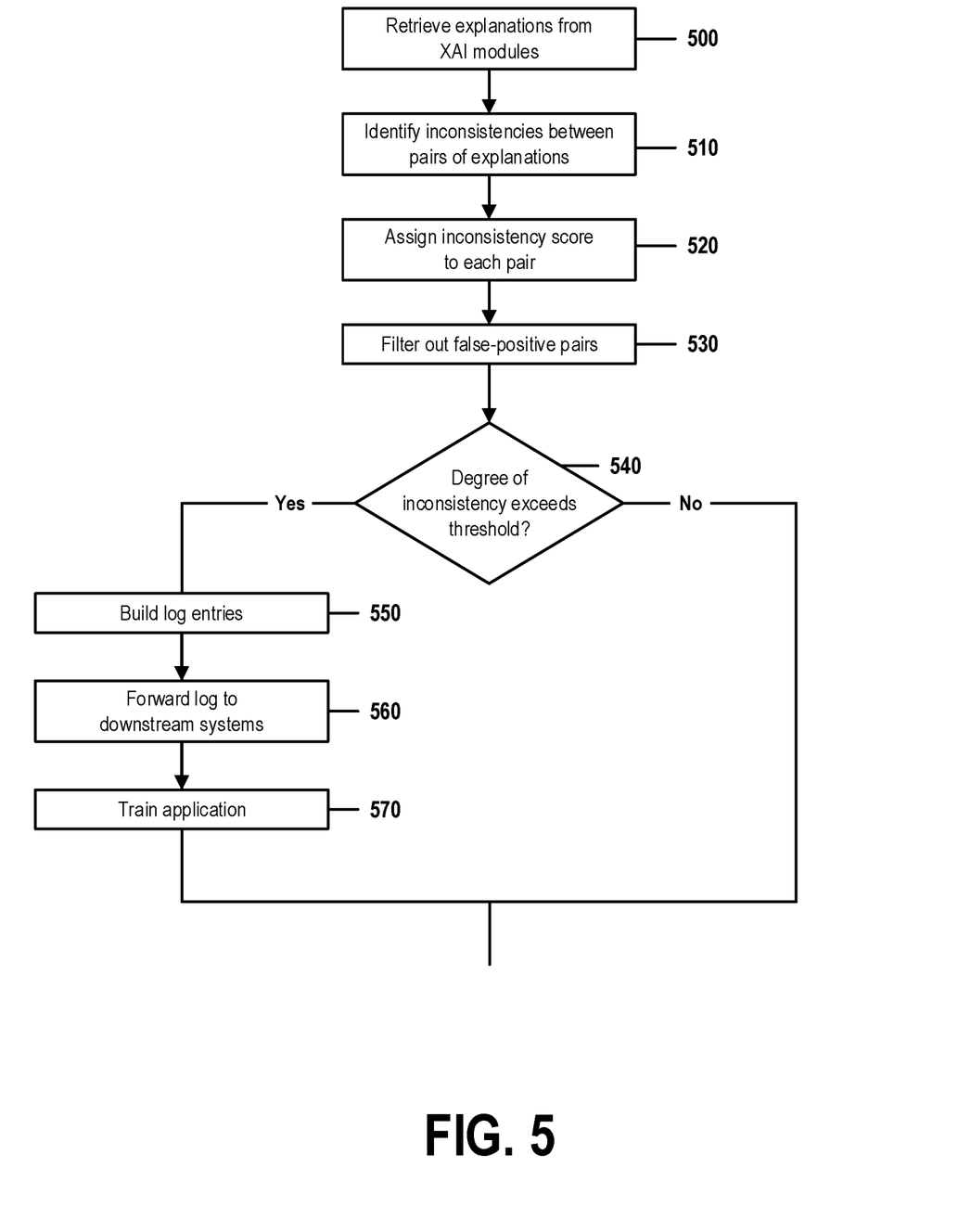
FIG. 5 is a flow chart that illustrates steps of a method for improved semantic consistency of explanations produced by explainable artificial intelligence applications in accordance with embodiments of the present invention.

FIG. 5 is a flow chart that illustrates steps of a method for improved semantic consistency of explanations produced by explainable artificial intelligence applications in accordance with embodiments of the present invention. FIG. 5 shows steps 500-570.

In step 500, an enhanced explainable artificially intelligent (XAI) system receives a set of N explanations E(1)-E(N) 415*a*-415*d* from modules M(1)-M(N) 410*a*-410*d* of an artificially intelligent application 4000. As explained in FIG. 4, modules 410*a*-410*d* are organized sequentially in application 4000 such that an $i^{th}$ module M(i) in the sequence generates an $i^{th}$ output OUT(i) that is forwarded as input to a next $(i+1^{st})$ module in the sequence, and where the $i^{th}$ module M(i) also generates an $i^{th}$ explanation E(i) of the reasoning upon which the $i^{th}$ output is based.

In certain embodiments, each module M(1)-M(N) 410*a*-410*d* generates a corresponding output OUT(1)-OUT(N) 405*a*-405*d* and a corresponding explanation E(1)-E(N) 415*a*-415*d* as a further function of receiving the input dataset 400 that had been submitted to application 4000 from an extrinsic source. In other words, each module M(1)-M(N) 410*a*-410*d* generates an output and an explanation based on both the value of each element of input dataset 400 and on the value of each element of the output, if any, produced by a module that is the immediately preceding module in the sequence of modules that make up application 4000.

The first module in the sequence (M(1) 410*a*) receives as input only the input dataset 400 that has been submitted to application 4000 from an extrinsic source. Output OUT(N) 405*d*, generated by the final module in the sequence (M(N) 410*d*), is forwarded by application 4000 as system output to downstream systems or users.

Each explanation may be formatted in any manner known in the art. Examples and embodiments presented in this document comprise explanations E(1)-E(N) 415*a*-415*d* that each contain TRUE or FALSE Boolean expressions. Here, each element of an $i^{th}$ explanation is a logical expression that represents or provides context or other explanation of an $i^{th}$ element of a corresponding output. For example, if a module M(j) produces an output O(j) and an explanation E(j), the fourth element of output O(j) may result from processing, by module M(j), a fourth element of an input dataset 400 and may be explained by a Boolean expression of the fourth element of explanation E(j). In other words, if input dataset 400 contains a set or array of elements, a module of application 4000 produces an output that contains a similar set or array of elements, at least some of which correspond to respective elements of input dataset 400. That module also produces an explanation that contains an array of elements that each corresponds to a respective element of the module's output.

This convention is presented for pedagogical reasons and should not be construed to limit embodiments of the present invention to Boolean-expression explanations. The present invention is flexible enough to accommodate any sort of explanation format that is preferred by an implementer, so long as that format does not prevent an embodiment from identifying or quantifying inter-explanation semantic inconsistencies, in a manner similar to those described in subsequent steps of FIG. 5.

In step 510, the system identifies semantic inconsistencies between corresponding elements of each possible pairing of explanations E(1)-E(N) 415*a*-415*d* received in step 510. For example, in this step, the system might compare elements of explanation E(1) 415*a* to corresponding elements of explanation E(3) 415*c*, comparing the first element of E(1) 415*a* to the first element of E(3) 415*c*, the second element of E(1) 415*a* to the second element of E(3) 415*c*, and so forth, repeating the entire procedure to compare every other combination of two explanations produced by modules of application 4000.

In examples and embodiments described herein, two explanation elements are deemed to be semantically inconsistent if the two Boolean expressions embodied by the two elements are logically inconsistent or identify disjoint, non-intersecting sets of results. For example, consider an application 4000 that infers or predicts characteristics of transactions performed by university students and teachers. In response to the submission of a 40-element input dataset 400 to application 4000, two modules of application 4000, M(k) and M(m), respectively generate 40-element outputs O(k) and O(m) and 40-element explanations E(k) and E(m). Each element of these explanations is a Boolean expression from which may be inferred explanations of the reasoning used by a corresponding module to derive a corresponding output element.

In this example, each element of E(k) consists of the Boolean expression:

$$E(k) = (\text{TransactionSize} \geq Th) \wedge (\text{UserProfile} = \text{Teacher})$$

and each element of E(m) consists of the Boolean expression:

$$E(m) = (\text{TransactionSize} \geq Th) \wedge (\text{UserProfile} = \text{Student})$$

where Th is a threshold value of a transaction size.

This means that an element of E(k) is a Boolean expression that evaluates to a value of TRUE if a corresponding transaction is performed by a Teacher and a transaction size greater than Th. Similarly, E(m) is a Boolean expression that evaluates to a value of TRUE if a corresponding transaction is performed by a Student and that the transaction is larger than Th. These expressions are evaluated in a similar way for each element of output O(k) or O(m), respectively. In some embodiments, certain modules may produce output that does not contain elements that correspond to every element of an input dataset. For example, a final module of an application that has received a 10-element input dataset may generate only 8 output elements. But even in such a case, an implementer may choose to configure an embodiment such that a module's output and explanation still contain elements that correspond to every element of the output.

In the current example, input dataset 400 consists of elements that each reference a particular transaction, identified by an element of input dataset 400, that has been performed by students, teachers, or combinations of students and teachers. Module M(k) identifies transactions of a certain size in which at least one transacting party is a teacher. Module M(m) identifies transactions of a certain size in which at least one transacting party is a student.

For example, if the sixth element of input dataset 400 identifies a transaction between two teachers that is larger than threshold Th, the sixth element of explanation E(k) evaluates to a value of TRUE and the sixth element of explanation E(m) evaluates to a value of FALSE. These values explain why the sixth element of output O(k) identifies a transaction that satisfies conditions of module M(m) and why the sixth element of output O(m) is an empty set. Similarly, if the third element of input dataset 400 identifies a transaction between two students that is larger than threshold Th, the third element of explanation E(k) is FALSE (explaining why the third element of output O(k) is empty) and the sixth element of explanation E(m) is TRUE. If the seventh element of input dataset 400 identifies a transaction between two students that is smaller than threshold Th, the seventh elements of explanation E(k) and explanation E(m) are both FALSE. Finally, if the eighth element of input dataset 400 identifies a transaction between a teacher and a student that is larger than threshold Th, the eighth elements of explanation E(k) and explanation E(m) are both TRUE.

A potential semantic inconsistency between an element of explanation E(k) and a corresponding element of explanation E(m) occurs when corresponding elements of two outputs are disjoint or, equivalently, when corresponding elements of the two explanations are inconsistent. In the running example, a possible inconsistency thus occurs when an element of input dataset 400 identifies a transaction that falls below threshold Th, resulting in disjoint outputs of modules M(k) and M(m) and FALSE values of explanations M(k) and M(m).

As will be explained below, some potential inconsistencies identified in this step, rather than being true inconsistencies, are merely expected results of submitting a particular input dataset. Existing methods of generating and interpreting XAI explanations cannot distinguish between a true training insufficiency of an application 4000 and correct, but seemingly anomalous, input-dependent result. However, embodiments of the present invention improve upon current XAI technology by providing a way to determine when an inconsistency between explanation elements indicates that an application 4000 has produced a true error.

At the conclusion of step 510, the system will have identified potential semantic inconsistencies between corresponding elements of pairs of two explanations E(1)-E(N) 415a-415d. In certain embodiments, the system will have identified potential semantic inconsistencies between all corresponding elements of certain pairs of explanations E(1)-E(N) 415a-415d, or will have identified potential semantic inconsistencies between corresponding elements every possible combination of two explanations E(1)-E(N) 415a-415d. If desired by an implementer, these inconsistencies will have been identified with sufficient granularity to determine exactly how many and which elements of an explanation pair are potentially inconsistent.

In step 520, the system assigns an inconsistency score to each pair of explanations that were compared in step 510. In some embodiments, an inconsistency score is assigned in this step to each possible combination of two explanations.

Inconsistency scores may be derived by any means known in the art, and may be derived by means of known or novel statistical, probabilistic, or cognitive method, including artificially intelligent methods based technologies like semantic analytics, machine learning, or text analytics. In all cases, an inconsistency score is a quantitative measure of a degree of semantic inconsistency between two explanations 415a-415d of application 4000

Embodiments and examples described in this document describe a type of inconsistency score that comprises a vector or matrix I in which each element describes a degree of inconsistency between one pair of explanations produced by application 4000. These embodiments and examples should not be construed to limit the present invention to such scores. The present invention is flexible enough to accommodate embodiments that represent a degree of inconsistency between two explanations in any manner desired by an implementer.

Embodiments that adopt the aforementioned vector or matrix representation I of an inconsistency score contain elements that each quantify a degree of inconsistency between a pair of explanations E(i) and E(j) of application 4000, expressed as:

$$I(i,j) = \frac{\text{\# elements for which Boolean satisfiability of } E(i) \text{ and } E(j) \text{ contradict}}{\text{total \# elements}}$$

For example, if explanations E(i) and E(j) each contain 20 elements, and the system in step 510, determined that four of those elements are potentially semantically inconsistent, then I(i,j) represents a degree of inconsistency between explanations E(i) and E(j) as:

$$I(i,j) = \frac{4}{20} = 0.2$$

In some embodiments, the total number of elements is defined as the number of elements in input dataset 400 or in system output 420 (the output of the final module 410d of application 4000). In other embodiments, the total number of elements, if preferred by an implementer, is defined as the number of elements contained in explanation E(i) or in explanation E(j) or as the number of pairs of elements in E(i) and E(j) that were compared in step 510.

At the conclusion of step 520, the system will have developed an inconsistency score of application 4000 that quantifies degrees of inconsistency between pairs of explanations produced by application 4000 in response to receiving a particular input dataset 400. Each degree of inconsistency in the score uniquely identifies one distinct degree of inconsistency between one distinct pair of explanations and no distinct pair of explanations is scored by more than one element of the inconsistency score.

In step 530, the system identifies, through inference or analysis, previously identified inconsistencies that are likely to be false positives. The system then revises the previously derived degrees of inconsistency such that each false-positive inconsistency is set to zero.

For example, in the above exemplary student-teacher transaction embodiment, an I(k,m) element of an inconsistency vector I may evaluate to a value of 1.0 if all 40 elements of explanations E(k) and E(m) are found to be semantically inconsistent. This may occur if none of the 40 elements of E(k) and E(m) overlap.

Such a result could occur if module M(k) or M(m) produces an explanation E(k) or E(m) that does not correctly explain how module M(k) or M(m) derived its respective output O(k) or O(m) after the submission of dataset 400 to application 4000 and could occur if module M(k) or M(m) does not derive an expected output O(k) or O(m) after the submission of dataset 400 to application 4000.

However, it is also possible that explanations E(k) and E(m) and outputs O(k) and O(m) are all correct and that the seemingly inconsistent explanations appear to be inconsistent because of a characteristic of an outlier, or unexpected, input dataset 400. For example, if the input dataset 400 identifies no transaction that exceeds minimum transaction size Th, then application 400's disjoint outputs O(k) and O(m) and seemingly inconsistent explanations E(k) and E(m) would have correctly indicated a statistically unlikely characteristic of the input dataset 400, rather than indicating a nonexistent error in the reasoning of module M(k) or M(m).

The same would be true if input dataset 400 references no transactions between students and teachers. In this case, the output set of module M(k) would reference only transactions performed by teachers but not students and the output set of module M(m) would reference only transactions performed by students but not teachers. The two outputs O(m) and O(k) would thus be disjoint, and explanations M(k) and M(m) would have been flagged as potentially being inconsistent. However, these results would not indicate a training or design error in module M(k) or M(m) because the disjoint output and FALSE Boolean values of the explanations would have been correct, if unexpected, results of an unexpected characteristic of input dataset 400.

In such a case, element I(k,m) would be reset by the system in step 530 to a value of 0, indicating that no semantic inconsistency has been detected between explanations E(k) and E(m). All other elements of the inconsistency vector are considered and revised as necessary in this step.

The system may determine when a possible inconsistency between two explanations, derived in step 510 and 520 is a false positive through any means known in the art. For example, the system may, through artificial intelligence, cognitive analytics, statistical or probabilistic analysis, or machine-learning technology, have been trained to infer semantic meaning to correlations, dependencies, and other relationships between input-dataset values and module outputs. In the teacher-student example, such an embodiment could identify a false positive by inferring that the Boolean expressions produce TRUE results only when certain input conditions exist, such as the existence of at least one input transaction between at least one teacher and one student that exceeds a certain size. These types of inferences and cognitive reasoning can be much more complex in real-world implementations, but are within the current state of the art of inferential computing technologies.

Furthermore, each time the system guesses that a previously identified inconsistency is actually a false positive, that guess can be confirmed through cognitive methods, such as by submitting the guess and its ultimate resolution to a machine-learning module that incorporates that data into a training corpus. Even incorrect identifications of a false-positive inconsistency can thus improve the ability of the system to correctly identify false-positives that occur with future input datasets 400, but which, despite being possibly unexpected, fall within the boundary constraints of application 4000's design.

The filtering of step 530 is an improvement to current XAI technology, which cannot identify when explanations produced by modules of an XAI application are semantically inconsistent in order to identify potential training or design errors in one or more modules of the application. Even if this was not true, known XAI applications cannot identify which identified inconsistencies are actually false positive identifications that are unexpected artifacts of a characteristic of a particular input dataset. These improvements allow a training module, such as a training module of a machine-learning application, to more accurately and completely train the XAI application, even when it had been previously presumed that the application was already fully trained.

In step 540, the system determines whether the inconstancy score derived in steep 520 indicates a likelihood of a training or logic error in application 4000. The system may interpret the contents of the inconsistency score, in order to infer such a likelihood, by any means known in the art. For example, an implementer may identify a inconsistency threshold value of 0.5, such that of any degree of inconsistency between a pair of modules would result in a determination that application 4000 is likely to suffer from a training insufficiency or design error; and that one or both of the pair of modules is most likely to be a local source of the insufficiency or error.

In other embodiments, the system in this step might infer a likelihood of a training or logic error in application 4000 if a total number of elements of an inconsistency vector exceed a threshold degree of inconsistency. For example, if a threshold degree of inconsistency is predefined as a value 0.2 and a threshold number of inconsistencies is predefined as a value of 5 when an input dataset contains 40 elements, then the system in step 540 would determine whether more than five elements of inconsistency vector I indicate degrees of inconsistency, between a pair of modules, greater than 0.2.

Other embodiments may comprise different or additional methods of identifying conditions necessary to identifying unacceptable inconsistencies, as desired by an implementer. In all cases, if the previously derived inconsistency scores satisfy those conditions, the method of FIG. 5 continues with steps 550-570. If the previously derived inconsistency scores do not satisfy the conditions necessary to indicate a likelihood that application 4000 suffers from a training or logic error that results in undesirable system output 420 when the current dataset 400 is submitted to application 4000, then the method of FIG. 5 ends. In this case, the method of FIG. 5 resumes with step 500 the next time that application 4000 produces explanations in response to receiving another set of input data.

In step 550, the system generates one or more log entries or other record of the results of previous steps of FIG. 5. This record may comprise any information deemed relevant by an implementer, but in all embodiments must include at least an identification of at least one pair of modules that have been determined to be sources of a confirmed semantic inconsistency between two explanations, an identification of the input dataset 400 that, when submitted to application 4000, resulted in the confirmed semantic inconsistency. Some embodiments may also add contextual or complementary information, such as an identification of the outputs of the two modules, an identification of the semantically inconsistent explanations, a record of the inconsistency scores or degrees of inconsistency that resulted in the performance of steps 550-570, or descriptions of design logic, requirements, prior training data, or other data from which may be identified a function or characteristic of application 4000.

In step 560, the system forwards the log entries or other record to downstream systems, to a machine-learning training application, or to a human administrator capable of training application 4000 to better handle input similar to that of input dataset 4000 or to address a possible design flaw suggested by the inconsistency results. For example, in the exemplary student-teacher embodiment, the forwarded record may contain information that can be used by a machine-learning training application to train application 4000 to better handle future input that specifies the same combination of transactions that resulted in semantic inconsistencies the last time that such transactions were submitted to application 4000 as the most recent input dataset 400.

In step 570, a machine-learning training component of the system incorporates the information forwarded to the component in step 560 into a machine-learning corpus that is then used to further train application 4000.

Each iteration of the method of FIG. 5 is performed whenever it is determined that application 4000, in response to receiving a specific input dataset 400, has produced unexpected output. In this manner, iterative identifications of semantic inconsistencies in the explanations produced by XAI application 4000 facilitate more refined training of application 4000, allowing application 4000 to better handle unusual types in input data.

In some embodiments, the system may take additional steps aimed at further improving the accuracy of application 4000 or the usefulness of explanations produced by application 4000.

For example, the system, based on results of inconsistency evaluations made by steps of the method of FIG. 5, may determine that false-positive explanations have over time been related to an inconsistent use of terminology in explanations produced by application 4000. This could happen when modules of application 4000 were developed by different developers at different times, or were repurposed from artificially intelligent applications originally developed for different purposes. In such cases, the system may infer, through cognitive or other types of inferential technologies, that false-positive explanations may have been made more likely by formal inconsistencies among explanations. The system would then advise an administrator or designer to revise application 4000 to produce more consistent explanations, or might automatically train application 4000, through a method of machine-learning, to produce explanations that are formally consistent. In other cases, the system might direct application 4000, or a downstream application, to ensure that explanations generated by application 4000 conform to a certain ontology or ontologies that ensure the explanations comprise consistent terminology, structures, or formats.

Examples and embodiments of the present invention described in this document have been presented for illustrative purposes. They should not be construed to be exhaustive nor to limit embodiments of the present invention to the examples and embodiments described here. Many other modifications and variations of the present invention that do not depart from the scope and spirit of these examples and embodiments will be apparent to those possessed of ordinary skill in the art. The terminology used in this document was chosen to best explain the principles underlying these examples and embodiments, in order to illustrate practical applications and technical improvements of the present invention over known technologies and products, and to enable readers of ordinary skill in the art to better understand the examples and embodiments disclosed here.

What is claimed is:

1. An explainable artificially intelligent (XAI) system comprising a processor, a memory coupled to the processor, and a computer-readable hardware storage device coupled to the processor, the storage device containing program code configured to be run by the processor via the memory to implement a method for improved semantic consistency of explanations in explainable artificial intelligence applications, the method comprising:
   in response to a submission of an input dataset to an artificially intelligent application, receiving, by the system, an explanation from each module of the application,
      where the modules are configured within the application in a serial sequence in which each module, upon receiving the input dataset and any input generated by an immediately preceding module of the serial sequence, generates output that is forwarded as input to a next module, if any, in the sequence, and
      where each explanation of the received explanations explains an artificially intelligent reasoning by which a corresponding output is generated by a corresponding module of the application;
   the system determining that two of the received explanations are semantically inconsistent; and
   as a result of the determining, directing, by the system, a machine-learning training component to train the system to more accurately respond to inputs that share a characteristic with the input dataset.

2. The system of claim 1, where the determining comprises:
   identifying one or more potentially inconsistent pairs of explanations, of the received explanations, by performing a semantic analysis upon each explanation of the received explanations; and
   filtering out a false-positive pair of the potentially inconsistent pairs by using an artificially intelligent method of cognitive computing to determine that inconsistencies between two explanations of the false-positive pair are an expected consequence of the characteristic of the input dataset.

3. The system of claim 2, where the more accurate response to inputs that share the characteristic with the input dataset comprises more accurately identifying the false-positive pair.

4. The system of claim 1, where the determining comprises:
- quantifying a degree of inconsistency between the two semantically inconsistent explanations as a function of a total number of elements of the input dataset that are associated with a Boolean inconsistency between a first explanation of the two semantically inconsistent explanations and a second explanation of the two semantically inconsistent explanations; and
- identifying that the degree of inconsistency exceeds a predefined threshold level.

5. The system of claim 1, where the determining comprises:
- determining an existence of a systemic error in one or both of two modules of the application if a corresponding element of an inconsistency vector exceeds a predefined threshold inconsistency value, where each element of the inconsistency vector identifies a relative number of elements of the input dataset that are associated with a Boolean inconsistency between the explanations generated by the two modules.

6. The system of claim 5, wherein the method comprises:
- recording, by the system, a log entry in an inconsistency log, where the log entry identifies the two semantically inconsistent modules and the input dataset;
- forwarding, by the system, the log to the machine-learning training component; and
- directing, by the system, the machine-learning training component to incorporate contents of the log entry into a machine-learning corpus to be submitted to the application during a subsequent machine-learning training session.

7. The system of claim 1, where each explanation of the set of explanations is selected from the group consisting of: a Boolean expression, natural-language text, and a string of alphanumeric characters.

8. The system of claim 1, where the more accurate response to inputs that share the characteristic with the input dataset comprises more accurately identifying, explaining, and mitigating potential inconsistencies between modules of the application.

9. A method for improved semantic consistency of explanations in explainable artificial intelligence applications, the method being performed by
- an explainable artificially intelligent (XAI) system comprising a processor, a memory coupled to the processor, and a computer-readable hardware storage device coupled to the processor, the storage device containing program code configured to be run by the processor via the memory to implement the method for improved semantic consistency of explanations in explainable artificial intelligence applications, the method comprising:
- in response to a submission of an input dataset to an artificially intelligent application, receiving, by the system, an explanation from each module of the application,
  - where the modules are configured within the application in a serial sequence in which each module, upon receiving the input dataset and any input generated by an immediately preceding module of the serial sequence, generates output that is forwarded as input to a next module, if any, in the sequence, and
  - where each explanation of the received explanations explains an artificially intelligent reasoning by which a corresponding output is generated by a corresponding module of the application;
- determining, by the system, that two of the received explanations are semantically inconsistent; and
- as a result of the determining, directing, by the system, a machine-learning training component to train the system to more accurately respond to inputs that share a characteristic with the input dataset.

10. The method of claim 9, where the determining comprises:
- identifying one or more potentially inconsistent pairs of explanations, of the received explanations, by performing a semantic analysis upon each explanation of the received explanations; and
- filtering out a false-positive pair of the potentially inconsistent pairs by using an artificially intelligent method of cognitive computing to determine that inconsistencies between two explanations of the false-positive pair are an expected consequence of the characteristic of the input dataset.

11. The method of claim 10, where the more accurate response to inputs that share the characteristic with the input dataset comprises more accurately identifying the false-positive pair.

12. The method of claim 9, where the determining comprises:
- quantifying a degree of inconsistency between the two semantically inconsistent explanations as a function of a total number of elements of the input dataset that are associated with a Boolean inconsistency between a first explanation of the two semantically inconsistent explanations and a second explanation of the two semantically inconsistent explanations; and
- identifying that the degree of inconsistency exceeds a predefined threshold level.

13. The method of claim 9, where the determining comprises:
- determining an existence of a systemic error in one or both of two modules of the application if a corresponding element of an inconsistency vector exceeds a predefined threshold inconsistency value, where each element of the inconsistency vector identifies a relative number of elements of the input dataset that are associated with a Boolean inconsistency between the explanations generated by the two modules.

14. The method of claim 13, comprising:
- recording, by the system, a log entry in an inconsistency log, where the log entry identifies the two semantically inconsistent modules and the input dataset;
- forwarding, by the system, the log to the machine-learning training component; and
- directing, by the system, the machine-learning training component to incorporate contents of the log entry into a machine-learning corpus to be submitted to the application during a subsequent machine-learning training session.

15. The method of claim 9, comprising providing at least one support service for at least one of creating, integrating, hosting, maintaining, and deploying computer-readable program code in the computer system, wherein the computer-readable program code in combination with the computer system is configured to implement the receiving, the determining, and the directing.

16. A computer program product for an explainable artificially intelligent (XAI) system, the computer program product comprising a computer readable storage medium having program instructions embodied therewith, the program instructions executable by a processor to cause the processor to perform a method for improved semantic consistency of explanations in explainable artificial intelligence applications, the method comprising:

in response to a submission of an input dataset to an artificially intelligent application, receiving, by the system, an explanation from each module of the application, where the modules are configured within the application in a serial sequence in which each module, upon receiving the input dataset and any input generated by an immediately preceding module of the serial sequence, generates output that is forwarded as input to a next module, if any, in the sequence, and where each explanation of the received explanations explains an artificially intelligent reasoning by which a corresponding output is generated by a corresponding module of the application;

determining, by the system, that two of the received explanations are semantically inconsistent; and as a result of the determining, directing, by the system, a machine-learning training component to train the system to more accurately respond to inputs that share a characteristic with the input dataset.

17. The computer program product of claim 16, where the determining comprises:

identifying one or more potentially inconsistent pairs of explanations, of the received explanations, by performing a semantic analysis upon each explanation of the received explanations; and filtering out a false-positive pair of the potentially inconsistent pairs by using an artificially intelligent method of cognitive computing to determine that inconsistencies between two explanations of the false-positive pair are an expected consequence of the characteristic of the input dataset.

18. The computer program product of claim 17, where the more accurate response to inputs that share the characteristic with the input dataset comprises more accurately identifying the false-positive pair.

19. The computer program product of claim 16, where the determining further comprises:

quantifying a degree of inconsistency between the two semantically inconsistent explanations as a function of a total number of elements of the input dataset that are associated with a Boolean inconsistency between a first explanation of the two semantically inconsistent explanations and a second explanation of the two semantically inconsistent explanations; and identifying that the degree of inconsistency exceeds a predefined threshold level.

20. The computer program product of claim 16, where the determining further comprises:

determining an existence of a systemic error in one or both of two modules of the application if a corresponding element of an inconsistency vector exceeds a predefined threshold inconsistency value, where each element of the inconsistency vector identifies a relative number of elements of the input dataset that are associated with a Boolean inconsistency between the explanations generated by the two modules.

* * * * *